United States Patent
Brar et al.

(10) Patent No.: US 12,443,254 B2
(45) Date of Patent: Oct. 14, 2025

(54) APPARATUS AND METHOD FOR CONTROLLING TEMPERATURE IN AN ELECTRONIC DEVICE

(71) Applicant: Thomson Licensing, Cesson-Sevigne (FR)

(72) Inventors: Simeranjit Singh Brar, Suwanee, GA (US); Gangatharan Ekambaram, Chennai (IN); Navdeep Aujla, Johns Creek, GA (US); Anuja Prasad, Ernakulam (IN)

(73) Assignee: Thomson Licensing, Cesson-Sevigne (FR)

( * ) Notice: Subject to any disclaimer, the term of this patent is extended or adjusted under 35 U.S.C. 154(b) by 415 days.

(21) Appl. No.: 18/102,805

(22) Filed: Jan. 30, 2023

(65) Prior Publication Data

US 2024/0256014 A1   Aug. 1, 2024

(51) Int. Cl.
*G06F 1/20* (2006.01)
*G06F 1/3246* (2019.01)

(52) U.S. Cl.
CPC ............ *G06F 1/206* (2013.01); *G06F 1/3246* (2013.01)

(58) Field of Classification Search
CPC ............................... G06F 1/206; G06F 1/3246
USPC .................................................. 700/299, 300
See application file for complete search history.

(56) References Cited

U.S. PATENT DOCUMENTS

| | | |
|---|---|---|
| 7,085,945 B2 | 8/2006 | Silvester |
| 8,788,866 B2 | 7/2014 | Anderson et al. |
| 9,817,454 B2 | 11/2017 | Wang et al. |
| 10,007,310 B2 | 6/2018 | Saeidi et al. |
| 10,025,360 B2 | 7/2018 | Nanda et al. |
| 2005/0049729 A1* | 3/2005 | Culbert ................... G06F 1/324 713/340 |
| 2011/0301778 A1* | 12/2011 | Liang ...................... G06F 1/206 700/299 |

(Continued)

FOREIGN PATENT DOCUMENTS

CN           105259996 B      1/2016

OTHER PUBLICATIONS

Anonymous, "Fan Control of CPU, GPU, Mainboard, and AIO Fans" Argotronic website, posted Jul. 9, 2021 https://www.argusmonitor.com/how_to_control_system_cpu_and_gpu_fans_by_temperature.php?language=en.

*Primary Examiner* — Chun Cao
(74) *Attorney, Agent, or Firm* — James Shead; David Todd Shoneman; Michael A. Pugel

(57) ABSTRACT

A method and apparatus are described that include receiving data values from a plurality of sensors located in the apparatus operating in a normal mode. The method and apparatus further include determining if at least one sensor has entered a first elevated thermal operating state from a normal thermal operating state and providing a notification to enter a first elevated thermal mode of operation in the device if it is determined that the at least one sensor has entered the first elevated thermal operating state. The method and apparatus additionally include determining, while operating in a first elevated thermal mode of operation, if the operating state of all sensors have entered a normal thermal operating state and providing a notification to enter a normal mode of operation for the device if it is determined that all of the sensors have entered a normal thermal operating state.

20 Claims, 6 Drawing Sheets

(56) References Cited

U.S. PATENT DOCUMENTS

| | | | |
|---|---|---|---|
| 2012/0284547 A1* | 11/2012 | Culbert | G05D 23/24 |
| | | | 713/320 |
| 2013/0345892 A1* | 12/2013 | Lin | H03K 19/00369 |
| | | | 700/299 |
| 2014/0358318 A1 | 12/2014 | Lin et al. | |
| 2016/0124475 A1* | 5/2016 | Chandra | G06F 1/206 |
| | | | 700/300 |
| 2017/0285701 A1* | 10/2017 | Atkinson | G06F 1/324 |
| 2018/0157298 A1* | 6/2018 | Shah | G06F 1/206 |
| 2020/0218319 A1* | 7/2020 | Shah | G06F 1/206 |
| 2021/0405670 A1 | 12/2021 | Im et al. | |
| 2023/0367379 A1* | 11/2023 | Vaysman | G06F 1/324 |

\* cited by examiner

APPARATUS AND METHOD FOR CONTROLLING TEMPERATURE IN AN ELECTRONIC DEVICE

TECHNICAL FIELD

The present disclosure generally relates to a method and apparatus for temperature management in a device and more specifically to an apparatus and method for controlling temperature in a network communication device.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

Network communication devices are present in many communication systems today. Many of the communication devices used in these systems include a plurality of antennas for interfacing to multiple networks. These communication devices often include, but are not limited to, set-top boxes, gateways, cellular or wireless telephones, televisions, home computers, media content players, and the like. Many of these communication devices continue to be reduced in size. The reduced size creates less air space inside the device to dissipate and/or diffuse any heat that is generated by the electronic components resulting in higher ambient temperatures inside the device. Further, the performance of the communication devices continues to increase. The performance increase often requires newer high speed and often higher power consumption electronic components. As a result, the additional heat generated by the higher power electronic components further increases the ambient temperature.

Operating temperature in a device, such as a communication device, is an important factor in both the performance and reliability of the device. Many electronic components do not function optimally at increased ambient temperatures and some of these components may even suffer premature and/or catastrophic failure with extended periods of time operating at these increased ambient temperatures. Additional heat management mechanisms may be included in the device to reduce the effect of higher ambient temperatures on the operation of the device. Some designs may utilize fans to force air in and/or out of the interior of the device in order to lower the ambient temperature. Some of the designs may determine the operation of the fan based on one or more temperature values from sensors located in the device. In other designs, specific electronic components may be included that have an operational control that can reduce the operation or performance of the component based on the internal temperature of the component. These components often include some type of timing control that can adjust the on and off time of certain elements within the component. The reduction in operation or performance, even for a limited time period, can reduce the heat generated by the component and lower the ambient temperature in the device.

However, none of the mechanisms, including those described above, have been shown to be completely effective. For example, the fan is limited in effectiveness because it is only able to affect the temperature of the air inside the device over a small temperature range and cannot further adjust the operational characteristics of the heat generating components if needed. Further, the operational control mechanism that can be included in an electronic component is only capable of affecting the heat generated by the component based on the component's internal temperature and is not able to take into account heat generated by other components in the electronic device. Therefore, there is a need for a more effective heat management system that can take into account multiple heat sources and include multiple heat management mechanisms.

SUMMARY

These and other drawbacks and disadvantages presented by antenna assemblies for use in communication devices are addressed by the principles of the present disclosure. However, it can be understood by those skilled in the art that the present principles may offer advantages in other types of devices and systems as well.

According to an implementation, a method is described. The method includes receiving data values from a plurality of sensors located in a device, the device operating in a normal mode. The method further includes determining if at least one sensor from the plurality of sensors has entered a first elevated thermal operating state from a normal thermal operating state and providing a notification to enter a first elevated thermal mode of operation in the device if it is determined that the at least one sensor has entered the first elevated thermal operating state. The method additionally includes determining, while the device is in a first elevated thermal mode of operation, if the operating state of all sensors in the plurality of sensors have entered a normal thermal operating state and providing a notification to enter a normal mode of operation for the device if it is determined that all of the sensors have entered a normal thermal operating state.

According to another implementation, an apparatus is described. The apparatus includes a memory and a processor coupled to the memory. The processor is configured to receive data values from a plurality of sensors located in the apparatus, determine, while operating in a normal mode, if at least one sensor from the plurality of sensors has entered a first elevated thermal operating state from a normal thermal operating state, and provide a notification to enter a first elevated thermal mode in the device if it is determined that the at least one sensor has entered the first elevated thermal operating state. The processor is further configured to determine, while in a first elevated thermal mode, if the operating state of all sensors in the plurality of sensors have entered a normal thermal operating state and provide a notification to enter a normal mode for the device if it is determined that all of the sensors have entered a normal thermal operating state.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Figure 1:
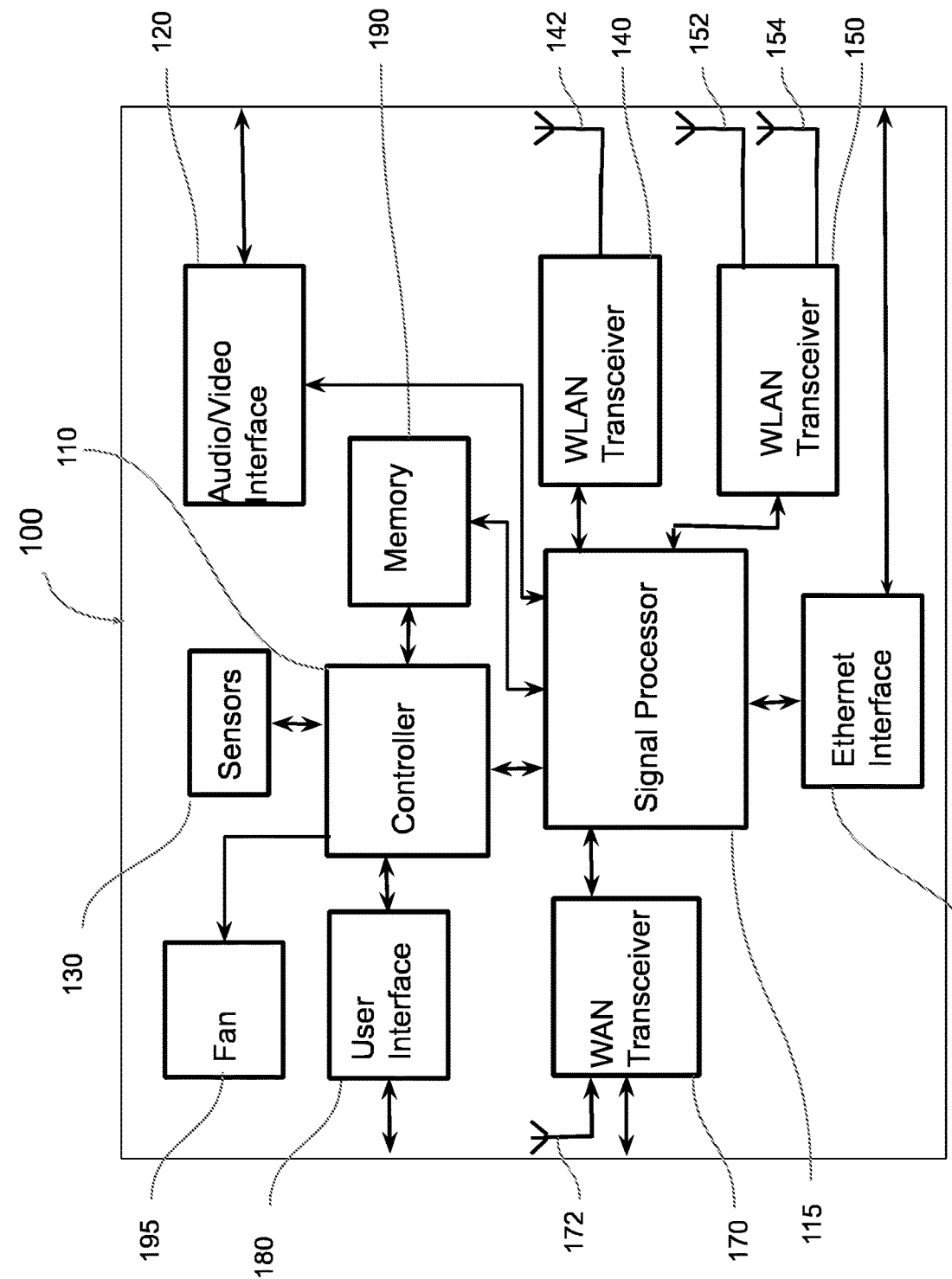
FIG. 1 is a block diagram of an exemplary communication device to which the principles of the present disclosure are applicable.

The present description illustrates the principles of the present disclosure. It will thus be appreciated that those skilled in the art will be able to devise various arrangements which, although not explicitly described or shown herein, embody the principles of the disclosure and are included within its spirit and scope. Further, while the embodiments described below are directed towards a specific type of network communication device, the principles of the present disclosure may be applicable to other devices, including other network communication devices, that require the control of temperature within the device.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with one or more intermediate components. Such intermediate components may include both hardware and software based components.

All examples and conditional language recited herein are intended for educational purposes to aid the reader in understanding the principles of the disclosure and the concepts contributed by the inventor to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative system components and/or circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor", "module" or "controller" should not be construed to refer exclusively to hardware capable of executing software, and may implicitly include, without limitation, a System on a Chip (SoC), digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the embodiments hereof, any element expressed or described, directly or indirectly, as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The present embodiments address problems and drawbacks associated with controlling the temperature of an electronic device, such as a network communication device. The present embodiments are particularly effective when one or more heat generating electronic components are included in an enclosure with limited air space and/or limited air flow. The problems take advantage of features within the electronic device but utilize those features in combination in a way that is different to how these features are typically utilized.

The present embodiments overcome these drawbacks by identifying a set of operating states for sensors in the electronic device, with each operating state defined by an increasing set of temperature threshold values for the sensors. Further, a set of operating modes for the electronic device are identified, with each operating mode implementing a different set of operational conditions to further control or reduce the temperature in the electronic device. The operating mode for the electronic device is determined based on the operating states for the sensors. Additionally, a hysteresis effect may be applied to one or both of the change in operating states for the thermal sensors and the change in operating modes for the electronic device. A more restrictive operating mode is entered when at least one sensor is in an elevated temperature threshold operating state. Once in the more restrictive operating mode, the electronic device only enters or returns to a less restrictive operating mode when all sensors are in a lower temperature threshold operation state. In a similar manner, a sensor is in an elevated operating state when its temperature value is greater or higher than the first threshold value. Once in the elevated operating state, the sensor may only enter or return to a lesser operating state when its temperature value is lower or less than a second threshold value, the second threshold being less than the first threshold value. Any number of operating states for the sensors and operating modes for the electronic device may be implemented in order to control the temperature in the electronic device in any number of ways.

Turning to FIG. 1, a block diagram of an exemplary communication device 100 according to aspects of the present disclosure is shown. Communication device 100 may operate as part of a home network or local network (LAN) that is connected to a wide area network (WAN). The WAN may provide consumer content, such as audio, video, and or data content to communication device 100 for further distribution on the LAN. The WAN may operate as one or more of a terrestrial, cable, satellite, or cellular communication network. The LAN may operate as a wired or wireless network and may be connected to other home devices. The home devices may include, but are not limited to, a handheld radio, a set-top box, a communication, a modem, a router, a cellular or wireless telephone, a cellular or wireless outdoor unit, a television, a home computer, a tablet, a media content player and the like. The LAN may utilize one or more protocols including, but not limited to Ethernet, Institute of Electrical and Electronics Engineers (IEEE) standard 802.11, Wi-Fi, Bluetooth, Zigbee, and the like. It is worth noting that several components and interconnections necessary for complete operation of communication device 100 are not shown in the interest of conciseness, as the components not shown are well known to those skilled in the art.

In communication device 100, a wide area network (WAN) is coupled to WAN transceiver 170 either through antenna 172 or through a direct network interface connection. WAN transceiver 170 is coupled to signal processor 115. Signal processor 115 is coupled to memory 190. Signal processor 115 is further coupled to audio/video interface 1220, wireless local area network (WLAN) transceiver 140, WLAN transceiver 150, and Ethernet interface 160. WLAN transceiver 140 is coupled to antenna 142. WLAN transceiver 150 is coupled to antenna 152 and antenna 154. A user interface 180 is coupled to controller 110. Controller 110 is also coupled to one or more sensors 130 along with memory 190 and signal processor 115. Controller 110 is further coupled to fan 195. It is worth noting that several components and interconnections necessary for complete operation of communication device 100 are not shown in the interest of conciseness, as the components not shown are well known to those skilled in the art.

WAN transceiver 170 includes circuitry to perform network RF signal modulation and transmission functions on a signal provided to the WAN through antenna 172 or direct network connection from communication device 100 as well as RF signal tuning and demodulation functions on a signal received from the WAN through antenna 172 or direct network connection at communication device 100. The RF modulation and demodulation functions are the same as those commonly used in communication systems, such as cable, satellite, digital subscriber line, or over the air terrestrial systems. These functions may include, but are not limited to, amplifiers, filters, frequency converters, analog/digital converters, demodulators, decoders, modulators, encoders, and the like. It is worth noting that in some embodiments, the WAN transceiver 170 may be referred to as a tuner even though WAN transceiver 170 may also include modulation and transmission circuitry and functionality. Signal processor 115 receives the demodulated network communication signals from WAN transceiver 170 and any provides any data or content from other elements in communication device 100 (e.g., WLAN transceiver 140, 150), formatted for network delivery over the WAN, to WAN transceiver 170. WAN transceiver 270 may also include circuitry for signal conditioning, filtering, and/or signal conversion (e.g., optical to electrical signal conversion). Antenna 172 may be any type of antenna suitable for transmitting and/or receiving signals in the frequency range or ranges used by the WAN. The type of antenna may include, but is not limited to, a dipole antenna, a high gain patch antenna, and the like. In some embodiments, antenna 172 may be located outside the mechanical structure of communication device 100 rather than within, as shown.

Audio/video interface 120 allows connection to an audio/video reproduction device, such as a television display device described above or other media device, such as a set top box and the like. Audio/video interface 120 may include additional signal processing circuitry including, but not limited to, digital to analog converters, signal filters, digital and/or analog signal format converters, modulators, demodulators, and the like. Audio/video interface 120 also includes one or more physical connectors to connect to the audio/video reproduction device using one or more of several different types of audio/video connecting cables. The one or more physical connectors may include, but are not limited to, RCA or phone type connectors, HDMI connectors, digital visual interface (DVI) connectors, Sony/Philips digital interface (S/PDIF) connectors, Toshiba Link (Toslink) connectors, and F-type coaxial connectors.

The sensors 130 generate data values based on measured characteristics associated with the operation of communication device 100, including one or more of the electronic components in communication device 100. In an embodiment, one or more of the sensors 130 are temperature sensors capable of generating data values representing the temperature in the proximate location of the sensor. Other types of sensors, such as infra-red sensors and thermistors, may be used in addition to, or instead of, temperature sensors. The data values generated by the sensors 130 are provided to controller 110.

Ethernet interface 160 allows connection to external devices (e.g., computer 250 described in FIG. 1) that are compliant with the IEEE 802.3 or similar communication protocol. Ethernet interface 160 includes a type RJ-45 physical interface connector or other standard interface connector to allow connection to an external local computer or other Ethernet connected device.

WLAN transceiver 140, along with antenna 142, and WLAN transceiver 150, along with antennas 152 and 154, provide a wireless communication interface to other devices in a home network or LAN. WLAN transceiver 140 and WLAN transceiver 150 may include various electronic circuits for performing the receiving and demodulation functions on signals received from other devices through antenna 142 and antennas 152 and 154, respectively. WLAN transceiver 140 and WLAN transceiver 150 may also include various electronic circuits for performing the modulation and transmitting functions on signals transmitted to other devices through antenna 142 and antennas 152 and 154, respectively. The various functions may be similar to those described above for WAN transceiver 170. Antennas 142, 152, and 154 may be any type of antenna suitable for transmitting and/or receiving signals in the frequency range or ranges used by the LAN. The type of antenna may include, but is not limited to, a dipole antenna, inverted f antenna, and the like. In some embodiments, one or more of antennas 142, 152, and 154 may be located outside the mechanical structure of communication device 100 rather than within, as shown.

Signal processor 115 receives signals containing digital content and/or data from WAN transceiver 170 and processes the digital content and/or data to provide as signals for use through audio/video interface 120, Ethernet interface 160, WLAN transceiver 140, and/or WLAN transceiver 150. Signal processor 115 further receives signals containing digital content and/or data from Ethernet interface 160, WLAN transceiver 140, and/or WLAN transceiver 150 and processes the digital content and/or data to provide signals for use through audio/video interface 120 and/or WAN transceiver 170. The processing in signal processor 115 may include, but is not limited to, data format conversion, data repackaging, error correction, data delivery management, arithmetic or logical function processing, and the like. Signal processor 115 may be configured as an application specific integrated circuit (ASIC) or as a programmable signal processing device that is reconfigurable with downloadable instructions or software code stored in memory 190. Signal processor 115 may alternatively be a specifically programmed data signal processor with internal control code for processing signals and data in communication device 100.

Controller 110 receives signals and data from user input interface 180. The controller 110 processes the user input signals and data and may generate control instructions to adjust operation of communication device 100 based on these inputs. Controller 110 may also generate signals and data and provide the signals and data to user interface 180. User interface 180 may include a user input or entry mechanism, such as a set of buttons, a keyboard, or a microphone. User interface 180 may also include circuitry for converting user input signals into a data communication format to provide to controller 110. User interface 180 may further include some form of user notification mechanism to show device functionality or status, such as indicator lights, a speaker, or a display. User interface 180 may also include circuitry for converting data received from controller 110 to signals that may be used with the user notification mechanism.

Controller 110 also processes the data values received from the sensors 130 and generates additional control instructions to adjust operation of communication device 100 based on these data values. The control instructions generated by controller 110 based on one or both of the data values from sensors 130 or signals and data from user interface 180 may be provided to signal processor 115 in order to control signal and data processing operations performed by signal processor 115. Further, one or more of the control instructions may be provided to fan 195 to control its operation, such as turning fan 195 on or odd. In some embodiments, the control instructions provided to fan 195 may include an adjustment for the operating speed of fan 195.

Controller 110 may be configured as a programmable microprocessor that is reconfigurable with downloadable instructions or software code stored in memory 190. Controller 110 may alternatively be a specifically programmed processing device with internal control code for managing and controlling operation in communication device 100. It is worth noting that, in some embodiments, controller 110 and signal processor 115 may be combined into a single processing unit. In these embodiments, the single processing unit may be referred to as a processor or a central processing unit (CPU).

Memory 190 supports the content and data processing as well as IP functions in signal processor 115 and also serves as storage for applications, programs, control code and media content and data information for controller 110 and signal processor 115. System memory 190 may include one or more of the following storage elements including, but not limited to, RAM, ROM, Electrically-Erasable Programmable ROM (EEPROM), and flash memory. System memory 190 may also encompass one or more integrated memory elements including, but not limited to, magnetic media hard disk drives and optical media disk drives.

In operation, data values are received at controller 110 from one or more sensors 130 positioned at one or more locations in communication device 100. The data values may include temperature values measured by sensors 130 at one or more locations. The controller 110 determines if an operating state of one of the sensors 130 has entered a first elevated thermal operating state. The determination may be made based on comparing the received temperature values from one of the sensors 130 to one or more threshold temperature values. The controller 110 generates a notification to enter a first elevated thermal mode of operation in communication device 100 if it is determined that one of the sensors 130 has entered the first elevated thermal state of operation. After entering the first elevated thermal mode, communication device 100 remains in the first elevated thermal mode even if more than one of the sensors 130 enters the first elevated thermal operating state. The controller 110 provides the notification to signal processor 115. After entering the first elevated thermal state of operation, controller 110, after receiving new data values, determines if the operating state of all of the sensors 130 that are in the first elevated thermal operating state have entered a normal thermal operating state. Controller generates and provides a new notification to enter a normal mode of operation for the communication device if it is determined that all of the sensors 130 have entered or are in a normal thermal operating state. In some embodiments, the controller 110 may provide the notifications or other associated instructions for entering either the first elevated thermal state of operation or the normal state of operation to other elements in communication device 100, such as fan 195. In some embodiments, controller 110 may provide the notifications to other devices through LAN transceivers 140 and 150, Ethernet interface 160, and/or WAN transceiver 170. Operations associated with controlling the temperature in a device, such as communication device 100, will be described in further detail below.

Figure 2:
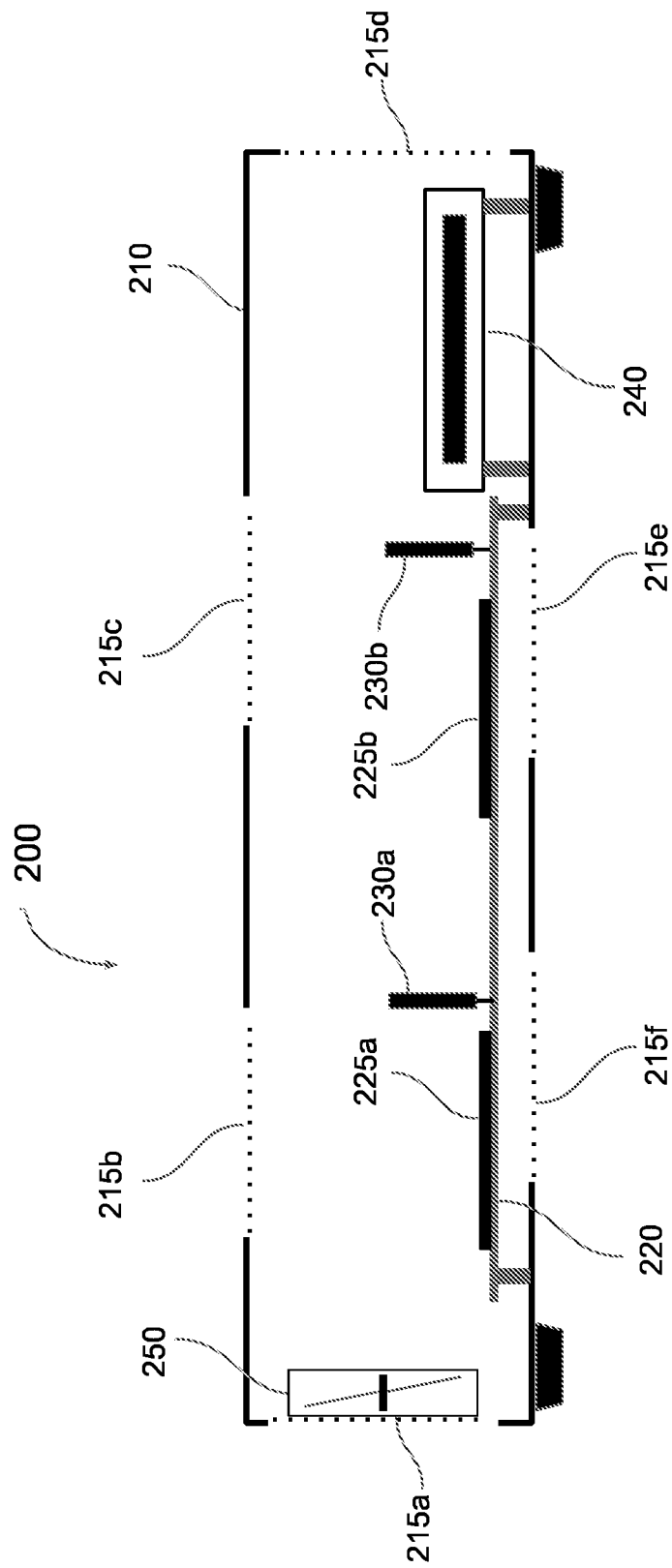
FIG. 2 is a diagram of a cross section of an electronic device to which the principles of the present disclosure are applicable.

Turning now to FIG. 2, a diagram of a cross section of an electronic device 200 according to aspects of the present disclosure is shown. Electronic device 200 may operate in a manner similar to communication device 100 described in FIG. 1. Electronic device 200 includes an enclosure 210. The surface of enclosure 210 includes vents 215a-215f that allow air to pass between the inside and the outside of electronic device 200. As shown, vents 215a and 215d are shown on opposite vertical surfaces. Vents 215b and 215c are shown on the top surface and vents 215e and 215f are shown on the bottom surface. The vents 215a-215f may be formed as slots or holes in the surface of enclosure 210. In other embodiments more or fewer vents may be included and the arrangement of the vents and/or vent openings may be different. Electronic device 200 also includes a printed circuit board 220. Two integrated circuits 225a and 225b are mounted to the top surface of printed circuit board 220. Integrated circuit 225a may be used as part of a wireless network transceiver, such as WAN transceiver 170 in FIG. 1. Integrated circuit 225b may be used as part of a signal processor, such as signal processor 115. Other components, such as resistors, capacitors, inductors, and the like, may also be mounted to printed circuit board 220. Further, components may be mounted to the bottom surface of printed circuit board 200. A memory device 240 is mounted to enclosure 210. The memory device 240 may be used as part of a memory element, such as memory 190. Memory device 240 may be a solid state memory device. Alternatively, memory device 240 may be a magnetic or optical disk drive memory device.

A thermal sensor 230a is mounted to printed circuit 220 board in close proximity to integrated circuit 225a. Additionally, a thermal sensor 230b is mounted to printed circuit board 220 in close proximity to integrated circuit 225b. Integrated circuits 225a and 225b consume power in order to operate and also generate heat. For example, electronic device 200 may use or dissipate eight watts of electrical power. At this power level, the area around thermal sensor 230a may measure 75 degrees Celsius while the thermal sensor 230b may measure 80 degrees Celsius while the area in other locations within enclosure 210 may measure 65 degrees Celsius. As a result, the areas around integrated circuit 225a and 225b will be higher in temperature than other areas within enclosure 210 for electronic device 200 as well as the ambient temperature outside enclosure 210. Thermal sensors 230a and 230b are used to monitor the temperature in the proximate area around integrated circuits 225a and 225b respectively in a manner similar to the one or more sensors 130 described in FIG. 1. Memory device 240 may also consume power in order to operate and will generate and emanate heat. Although not shown, memory device 240 may also include a thermal sensor that is used to monitor the temperature in the proximate area around memory device 240. Electronic device 200 further includes a fan 250 that can facilitate a forced transfer of air from within enclosure 210 to outside enclosure 210 through vents 215a-215f.

In operation, temperature values are generated by thermal sensors 230a and 230b and used to determine a thermal operating state for each of the sensors 230a and 230b. The temperature values may be generated on a periodic interval of time basis or may be generated when a request for values is made by a component (e.g., integrated circuit 225a) in electronic device 200. The thermal operating state may be determined based on comparing the temperature values from sensors 230a and 230b to one or more threshold values. In some embodiments, the thermal operating states may include a normal operating state, a first elevated thermal operating state, a second elevated thermal operating state, and a third elevated thermal operating state, each with a set of threshold values that are greater or higher in value than the values for the previous operating state. Other embodiments may have more or fewer operating states.

The thermal operating states for the thermal sensors 230a and 230b are then used to determine an operating mode for electronic device 200. If the thermal operating states for thermal sensors 230a and 230b are in the normal operating state, the electronic device operates in a normal operating mode. In normal operating mode, electronic device 200 may operate without any assisted air flow from fan 250.

If there is a determination that the thermal operating state for one of the thermal sensors 230a and 230b is in the first elevated operating state, electronic device 200 enters the first elevated thermal operating mode. In some embodiments, the first elevated thermal operating mode may be referred to as the fan control operating mode. The first elevated thermal operating mode may include controlling the operation of fan 250. Electronic device 200 remains in the first elevated thermal operating mode even if it is determined that the other one of the thermal sensors 230a and 230b is also in the first elevated thermal operating state.

If, while electronic device 200 is operating in the first elevated thermal operating mode, there is a determination that both thermal sensors 230a and 230b are in the normal operating state, electronic device 200 returns to the normal operating mode as described above.

If there is a determination that the thermal operating state for one of the thermal sensors 230a and 230b is in the second elevated operating state, then electronic device 200 enters the second elevated thermal operating mode. In some embodiments, the second elevated thermal operating mode may be referred to as the thermal throttle operating mode. The second elevated thermal operating mode may be used to control the operating characteristics or performance of electronic device 200. For example, the second elevated thermal operating mode may include shutting down a portion of one or both of integrated circuit 225a and integrated circuit 225b. Shutting down a portion of integrated circuit 225a and/or integrated circuit 225b reduces the power consumed resulting in less heat being generated. The portions of integrated circuit 225a and/or integrated circuit 225b that are shut down still allow operation of electronic device 200 to continue. However, either fewer operations and/or functions may be available for use or lower performance for some, or all of the operations and functions may occur. Electronic device 200 remains in the second elevated thermal operating mode even if it is determined that the other one of the thermal sensors 230a and 230b is also in the first elevated thermal operating state.

If, while electronic device 200 is operating in the second elevated thermal operating mode, there is a determination that both thermal sensors 230a and 230b are in the first elevated thermal operating state, electronic device 200 returns to the first elevated thermal operating mode as described above.

If it is determined that the thermal operating state for one of the thermal sensors 230a and 230b is in a third elevated operating state, electronic device 200 enters the third elevated thermal operating mode. In some embodiments, the third elevated thermal operating mode may be referred to as the thermal shutdown mode. The third elevated thermal operating mode may include shutting down, or putting into sleep mode, one or both of integrated circuit 225a and/or integrated circuit 225b as well as shutting down memory device 240. These actions are intended to significantly reduce the power dissipated as well as the heat generated in electronic device 200. The third elevated thermal operating mode may cause electronic device 200 to be inoperable. However, some basic control operating, including monitoring thermal sensors 230a and 230b and determining their operating states, may continue. Electronic device 200 may remain in the second elevated thermal operating mode even if it is determined that the other one of the thermal sensors 230a and 230b is also in the first elevated thermal operating state. Electronic device 200 may only return to the second elevated operating mode when both thermal sensors 230 and 230b are in a second elevated operating state. Electronic device 200 may also return to the second elevated operating mode after a period of time has passed or an input from a user is received.

It is worth noting that although four operating modes are described as part of the operation of electronic device 200, other embodiments may use more or fewer operating modes. For example, some embodiments may utilize only three operating modes. The normal operating mode may be referred to as the fan control mode, allowing the first elevated thermal operating mode to be referred to as the thermal throttle mode and the second elevated thermal operating mode to be referred to as the thermal shutdown mode. Further, some embodiments may not use a thermal shutdown down and use only a normal operating mode and a first elevated thermal operating mode.

Figure 3:
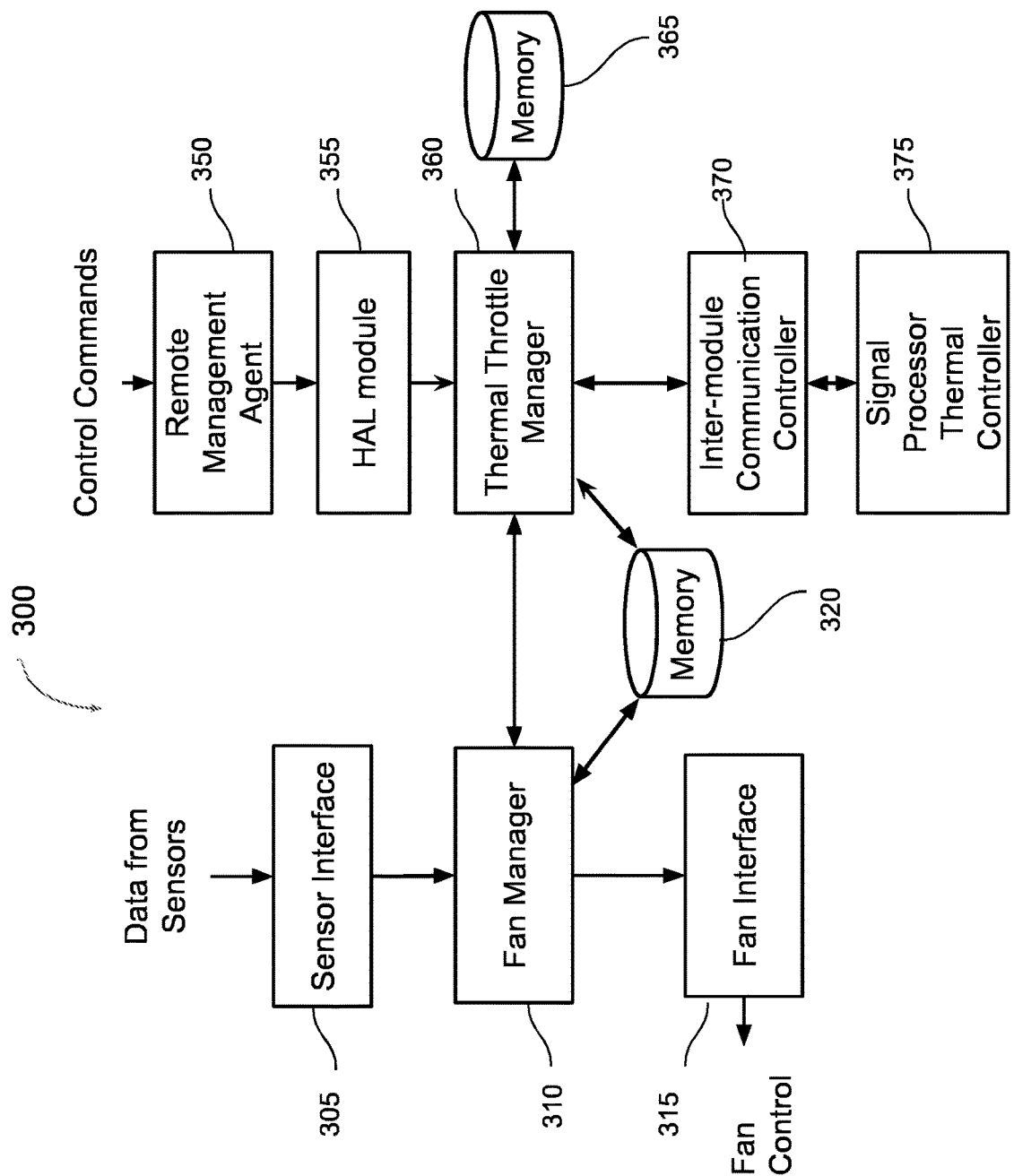
FIG. 3 is a diagram of an exemplary software structure used in a communication device to which the principles of the present disclosure are applicable.

Turning to FIG. 3, a diagram of an exemplary software structure 300 used in a device according to aspects of the present disclosure is shown. Software structure 300 may be included as part of the software used in one or more elements of a communication device, such as communication device 100 described in FIG. 1 More specifically, software structure 300 may be included as part of the software used to operate the controller and/or signal processor in a device (e.g., controller 110 and signal processor 115). The program instructions that are used for each of the modules in software structure 300 may be stored in a memory (e.g., memory 190) and provided to the controller and/or signal processor for execution either at initial start-up of the device or when requested by a user or operator through a user interface (e.g., user interface 180). Software structure 300 may also be included as part of the software used in one or more elements of an electronic device, such as electronic device 200 described in FIG. 2.

Data values from a set of sensors (e.g., one or more sensors 130 in FIG. 1) are provided to the sensor interface 305. Sensor interface module 305 is coupled to fan manager 310. Fan manager 310 is coupled to memory 320. Fan manager 310 is also coupled to fan interface 315 which provides an output control signal to a fan (e.g., fan 195 in FIG. 1). Commands or instructions from another portion of a controller (e.g., controller 110) are provided to remote management agent 350. Remote management agent 350 is coupled to hypertext application language (HAL) module 355. HAL module 355 is coupled to thermal throttle manager 360. Thermal throttle manager 360 is coupled to inter-module communication controller 370. Thermal throttle manager 360 is also coupled to memory 365. Thermal throttle manager 360 is additionally coupled to fan manager 310 and memory 320. Inter-module communication controller 370 is coupled to signal processor thermal controller 375.

The data from the sensors (e.g., sensors 130 in FIG. 1 or sensors 230a, 230b in FIG. 2) are processed in sensor interface 305. The data from the sensors represents temperature values at the locations for each of the sensors within the electronic device (e.g., electronic device 200). In some embodiments, the sensors may be located near or within electronic components that dissipate power in the electronic device. For example, sensors may be located near or within an electronic component associated with a controller (e.g., controller 110 in FIG. 1), a signal processor (e.g., signal processor 115), a LAN transceiver (e.g., WLAN transceiver 140 and 150), a WAN transceiver (WAN transceiver 170), and a memory device (e.g. memory 190) in the electronic device (e.g., communication device 100). In some embodiments, the sensors may be positioned or arranged in a pattern throughout the interior of the electronic device. Sensor interface 305 may include any specific data value conversion information needed to translate the format of the data from the format provided by each of the sensors to a format needed for processing in the fan manager 310. Sensor interface 305 may include one or more application programming interface (API) extensions to allow a connection between sensor interface 305 and fan manager 310. In some embodiments, the data values from the sensors are provided on a periodic interval of time basis. Further, in some embodiments, fan manager 310 may request data values by sending one or more query instructions to each of the sensors through sensor interface 305.

Fan manager 310 receives the processed sensor data values from sensor interface 305 and further processes the sensor data values to determine whether a sensor data value from one or more of the sensors (e.g., sensors 130 in FIG. 1 or sensors 230a and 230b in FIG. 2) have exceeded a threshold value. This threshold value may be a value at which the fan manager will initiate operation of a fan (e.g., fan 195 in FIG. 1 or fan 250 in FIG. 2) through fan interface 315. In some embodiments, different threshold values may be used for the sensor data values from one or more of the sensors. In some embodiments, the fan manager 310 may initiate operation of the fan only when the sensor data values for one or more specific sensors has exceeded a threshold value. In some embodiments, the fan may be capable of operating at different speeds. In these embodiments, the fan manager 310 may initiate operation of the fan at different speeds depending on how many sensors have provided sensor data values that exceed a threshold. Further, the fan manager may initiate operation of the fan at different speeds through the use of different threshold values that are associated with the different fan speeds.

In one or more embodiments, each one or the sensors (e.g., sensor 130 in FIG. 1 or sensors 230a and 230b in FIG. 2) may have an associated operating state value that is initially determined by the fan manager 310 and stored in the memory 320. When the fan manager 310 determines that a sensor data value associated with a sensor has exceeded a threshold value, the fan manager 310 updates the operating state stored in memory 320 for that sensor. For instance, when the sensor data value from a sensor is not exceeding the threshold value, the operating state may be identified by fan manager 310 as the normal operating state and stored in memory 320. When the sensor data value exceeds the threshold value, the operating state may be identified by fan manager 310 as an elevated thermal operating state and stored. The operating state for the sensor may be changed back to the normal operating state when the sensor data no longer exceeds the threshold value.

More than two operating states may be identified for one or more of the sensors. For example, a second thermal operating state may be identified for each of the sensors when the sensor data value for any of the sensors exceeds a second threshold value that is a higher or greater value than the first threshold value. Additionally, a different threshold value may be used when a sensor is changing from a first operating state to a second operating state and when that sensor is changing from the second operating state back to the first operating state. For example, a first threshold value may be used as the threshold value to determine if the sensor changes from the normal operating state to the first thermal operating state. A different, second, threshold value may be used as the threshold value to determine if the changes back from the first thermal operating state to the normal operating state. These thresholds may be referred to as the upper state transition threshold and a lower state transition threshold. Each operating state may have an upper state transition threshold and a lower state transition threshold. Further, the lower state transition threshold value for a higher operating state (e.g., the first thermal operating state) being lower or less than upper state transition threshold value for the next lower operating state (e.g., the normal operating state). In this manner the threshold value to which the value from the sensor must exceed to enter the next higher operating state is a higher value than the threshold value to which the value from the sensor must be below. The difference in threshold values may be referred to as the hysteresis may be referred to as a hysteresis threshold value. The fan manager 310 also initially determines the operating mode for the electronic device. In some embodiments, the fan manager 310 performs the determination during any operating modes that involve control of the fan through fan interface 315, such as the normal operating mode of the electronic device.

Control commands and control inputs for use as part of controlling the temperature in an electronic device are provided through remote management agent 350. The control commands or inputs may be provided through a user interface (e.g., user interface 180) or through a network connection (e.g., a WAN or a LAN). The remote management agent 350 is a program module that may be packaged within a network interface element (e.g., WAN transceiver 170, Ethernet interface 160, and WLAN transceiver 140) or in the network interface portion of a controller (e.g., controller 110). The remote management agent 350 may collect the management information database from the electronic device and use it in conjunction with interpreting received control commands. Exemplary implementations of remote management agent 350 may include, but are not limited to, simple network management (SNMP) agent, transmission control protocol (TCP) agent, yet another next generation (YANG) and the like. The processed control commands from remote management agent 350 are provided to the HAL module 355. The HAL module converts any hypertext language included in the control commands or control inputs into commands that can be used by the thermal throttle manager 360.

The thermal throttle manager 360 operates in conjunction with fan manager 310. The thermal throttle manager takes over the determinations performed initially by fan manager 310 once the operating mode for the electronic device reaches an operating mode involving thermal throttling control of electronic components, such as any operating mode higher than the normal operating mode. At that point, the fan manager 310 provides a notification of the new operating mode for the electronic device to the thermal throttle manager 360. The fan manager 310 may also provide identification information for accessing the current operating states as well as the threshold values for the sensors stored in memory 320. As with the fan manager 310 above, the thermal throttle manager 360 determines the operating states for the sensors based on received sensor data values. The thermal throttle manager 360 further determines the operating mode of the electronic device based on the operating states of the sensors. If the operating mode enters or returns to an operating mode not involving thermal throttling control of electronic components (e.g., normal operating mode), the thermal throttle manager 360 provides a notification back to the fan manager 310 to take over the determinations again.

Additionally thermal throttle manager 360 may store in, and retrieve from, memory 365 the specific instructions for operational conditions of the various elements in the electronic device during each of the operating modes. The thermal throttle manager 360 may also store specific configuration information for operating the signal processor (e.g., signal processor 115 in FIG. 1) during the operating modes. The thermal throttle manager 360 provides the specific instruction and specific configuration information needed for operating of the signal processor during an operating mode to the inter-module communication controller 370.

The inter-module communication controller 370 controls and manages the communication of data and control information between modules in a software application, particularly when some modules are included on different physical components within the device (e.g., communication device 100 in FIG. 1). For example, the inter-module communication controller 370 may control and manage communication between a controller device (e.g., controller 110) and a signal processing device (e.g., signal processor 115). Example implementations of inter-module communication controller 370 include, but are not limited to, an inter-thread communication (ITC) controller, an inter-process communication (IPC) controller and the like.

The signal processor thermal controller 375 interfaces with the signal processor (e.g., signal processor 115 in FIG. 1) to provide instructions for changing the operational characteristics of the signal processor based on the operating mode. For example, the instructions provided from signal processor thermal controller 360 may include instructing the signal processor to disable operation of the LAN transceiver (e.g., WLAN transceiver 140 and WLAN transceiver 150) when the electronic device is operating in a first elevated thermal mode. The instruction provided from signal processor thermal controller 360 may include instructing the signal processor to disable operations of all functions in the electronic device except the controller (e.g., controller 110) and instructing the signal processor to enter standby or slope mode when the electronic device is operating in a second elevated thermal mode.

It is worth noting that, in some embodiments, one or more the operating modes used for controlling temperature in the device (e.g., communication device 100 in FIG. 1) may utilize both changes in control of a fan through fan manager 310 as well as control of operation of electronic components through thermal throttle manager 360. For example, when the device is operating in normal operating mode, the fan manager 310 provides instructions to run the fan at low speed. In a first elevated thermal operating mode, the fan manager 310 provides instructions to run the fan at a medium speed. In a second elevated thermal operating mode, the fan manager 310 provides instructions to run the fan at a high speed while thermal throttle manager 360 provides instructions to cease at least one operation in one electronic component in the device. Other combinations of fan speed control and thermal throttle control are also possible.

The modules described in software structure 300 are exemplary and may be implemented and/or executed on one or more processors, any of which may be application specific integrated circuits (ASICs), reduced instruction set computers (RISCs), field programmable gate arrays (FPGAs) or the like or equivalent. The number of, and partitioning of, these modules may be increased, decreased, or re-configured to generally produce the same results with no ill effect upon the design.

Figure 4:
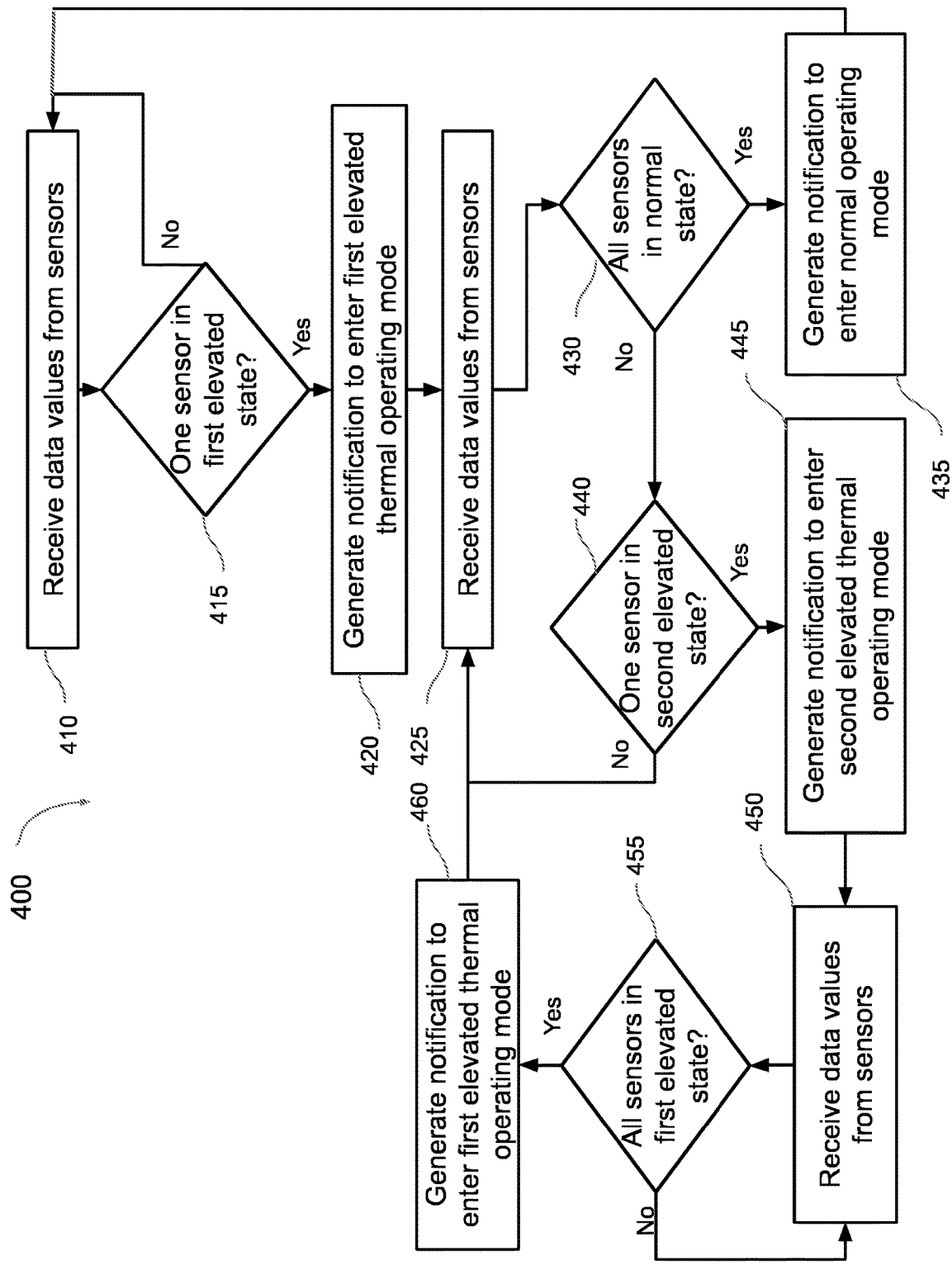
FIG. 4 is a flow chart of an exemplary process for controlling temperature in an electronic device to which the principles of the present disclosure are applicable.

Turning to FIG. 4, a flow chart of an exemplary process 400 for controlling temperature in an electronic device according to aspects of the present disclosure is shown. Process 400 is primarily described with respect to a communication device, such as communication 100 described in FIG. 1. Some or all of process 400 may be used with other electronic devices, such as electronic device 200 described in FIG. 2. Additionally, one or more of the steps of process 400 may be implemented in one or more of the software elements or modules described in software structure 300 in FIG. 3. Although process 400 depicts steps performed in a particular order for purposes of illustration and discussion, the operations discussed herein are not limited to any particular order or arrangement. One skilled in the art, using the disclosure provided herein, will also appreciate that one or more of the steps of process 400 may be omitted, rearranged, combined, and/or adapted in various ways.

At step 410, data values from the set of sensors (e.g., sensors 130) are received. The set of sensors may be positioned at different locations within the device (e.g., communication device 100). The data values may be received by a controller (e.g., controller 110). In some embodiments, the set of sensors may be initially operating in a normal operating state, such as when the device is first turned on or re-started. Further, the device may be operating in a normal operating mode.

At step 415, a determination is made as to whether a sensor from the set of sensors is operating in, or has entered, a first elevated thermal operating state. In other words, the determination, at step 415, indicates that the sensor has changed or transitioned from operating in an initial operating state (e.g., the normal operating state) to an elevated or higher operating state (e.g., the first elevated thermal operating state) indicating an increase in value (e.g., temperature value) at the sensor. The determination, at step 415, may be performed in a controller (e.g., controller 110). In some embodiments, the determination, at step 415, may include determining if a value, such as a temperature, from the sensor has exceeded a first threshold value. The first threshold value may be referred to as the upper state transition threshold for the operating state of the sensor (e.g., normal operating state), as described above. In some embodiments, the value from the sensor may be required to exceed the first threshold value for a period of time. For instance, the period of time may be two consecutive values from the sensor. The values may be measured and provided at a periodic interval of time, such as one measurement every 100 milliseconds.

If, at step 415, the determination is made that one sensor is not in the first elevated thermal operating state, then process 400 returns to receiving data values from the set of sensors, at step 410. If, at step 415, the determination is made that one sensor from the set of sensors (e.g., sensors 130) is in the first elevated thermal operating state, then, at step 420, a notification is generated to enter a first elevated thermal operating mode in the device (e.g., communication device 100). In some embodiments, the notification may be generated by a controller (e.g., controller 110) and provided to a signal processor (e.g., signal processor 115) for executing the conditions of the first elevated thermal operating mode. In some embodiments, the notification may be generated to control the operating conditions of one or more components in the device to reduce the operating temperature. For example, operating speed of a fan (e.g., fan 195) may be adjusted in a manner similar to that described above for fan manager 310 in FIG. 3. Further, functional limitations in a component, such as a network interface component (e.g., WAN transceiver 170 or LAN transceivers 140, 150) may be adjusted in a manner similar to that described for thermal throttle manager 360 and signal processor thermal controller 375. The device remains in the first elevated thermal operating mode as long as at least one sensor from the set of sensors is in the first elevated thermal operating state.

At step 425, with the device (e.g., communication device 100) operating in the first elevated thermal operating mode, additional data values are received from the set of sensors in a manner similar to step 410. At step 430, a determination is made as to whether all of the sensors from the set of sensors are in a normal operating state. In other words, any sensors from the set of sensors that were previously operating in a first elevated operating state (e.g., the first elevated operating state) have now changed or transitioned back to operating in the previous operating state (e.g., the normal operating state) indicating a decrease in value (e.g., temperature value) at the sensor. The determination, at step 430, may be performed in a controller as described at step 415. In some embodiments, the determination, at step 430, may include determining if a value, such as a temperature, from the sensor is below or less than a second threshold value. The second threshold value may be referred to as the lower state transition threshold for the operating state of the sensor (e.g., first elevated thermal operating state). In some embodiments, the second threshold value, or lower state transition threshold value, may be different from the first threshold value, or upper state transition threshold value. For example, the second threshold value may be two degrees lower or less than the first threshold value. In some embodiments, the values from the sensors may be required to be less than the second threshold value for a period of time as described above at step 415.

If, at step 430, the determination is made that all of the sensors from the set of sensors are in a normal operating state, then at step 435, a notification is generated to enter or return to the normal operating mode in the device (e.g., communication device 100). The notification may be generated by a controller (e.g., controller 110) and provided to a signal processor (e.g., signal processor 115) for removing the conditions of the first elevated thermal operating mode and executing the conditions of the normal operating mode. Process 400 returns to receiving data from the set of sensors at step 410.

If, at step 430, the determination is made that all of the sensors from the set of sensors are not in a normal operating state, then, at step 440, a determination is made as to whether at least one sensor from the set of sensors is in a second elevated thermal operating state. The determination, at step 440, may be made in a manner similar to that described at step 415 above, but using a value for the first, or upper state transition, threshold value that is associated with the first elevated thermal operating mode. The first, or upper state transition, threshold value for the that is associated with the first elevated thermal operating mode will be a greater or higher value (e.g., temperature value) than the first threshold value used, at step 415. If, at step 440, the determination is made that at least one sensor from the set of sensors is not in a second elevated thermal operating state, then process 400 returns to receiving data values from the set of sensors, at step 425.

If, at step 440, the determination is made that one sensor from the set of sensors (e.g., sensors 130) is in the second elevated thermal operating state, then, at step 445, a notification is generated to enter a second elevated thermal operating mode in the device (e.g., communication device 100). The notification may be generated by a controller (e.g., controller 110) and provided to a signal processor (e.g., signal processor 115) for executing the conditions of the second elevated thermal operating mode. In some embodiments, the notification may be generated to further control the operating conditions of one or more components in the device over the control executed as part of the first elevated thermal operating mode in order to reduce the operating temperature. The device remains in the second elevated thermal operating mode as long as at least one sensor from the set of sensors is in the second elevated thermal operating state.

At step 450, while the device (e.g., communication device 100) is operating in the second elevated thermal operating mode, additional data values are received from the set of sensors in a manner similar to step 410. At step 455 a determination is made as to whether all of the sensors from the set of sensors are in the first elevated thermal operating state. The determination, at step 455, is made in a manner similar to that described at step 430 above. If, at step 455, the determination is made that all of the sensors from the set of sensors are not in the first elevated thermal operating state, then process 400 returns to receiving data values from the set of sensors, at step 450.

If, at step 455, the determination is made that all of the sensors from the set of sensors are in the first elevated thermal operating state, then at step 460, a notification is generated to enter or return to the first elevated thermal operating mode in the device (e.g., communication device 100) in a manner similar to that described at step 435. The notification may be generated by a controller (e.g., controller 110) and provided to a signal processor (e.g., signal processor 115) for removing the conditions of the second elevated thermal operating mode and executing the conditions of the first elevated thermal operating mode. Process 400 returns to receiving data from the set of sensors, while the device is in the first elevated thermal operating mode, at step 425.

It is worth noting that processes similar to process 400 may utilize more or fewer operating modes in the device (e.g., communication device 100) and/or more or fewer operating states for the sensors (e.g., sensors 130). Further, each of the operating modes may utilize a combination of one or both of controlling the speed of a fan and adjusting the performance or operational status of one or more components in the device as described above. The number of operating modes as well as the control combinations used for each of the operating modes may be determined based on required performance and temperature control characteristics for the device. For example, the operating modes and control combinations may be determined based on acceptable tradeoffs between the acoustical noise made by the fan (e.g., fan 195) and the effect of high temperatures on the reliability of the components in the device.

Figure 5:
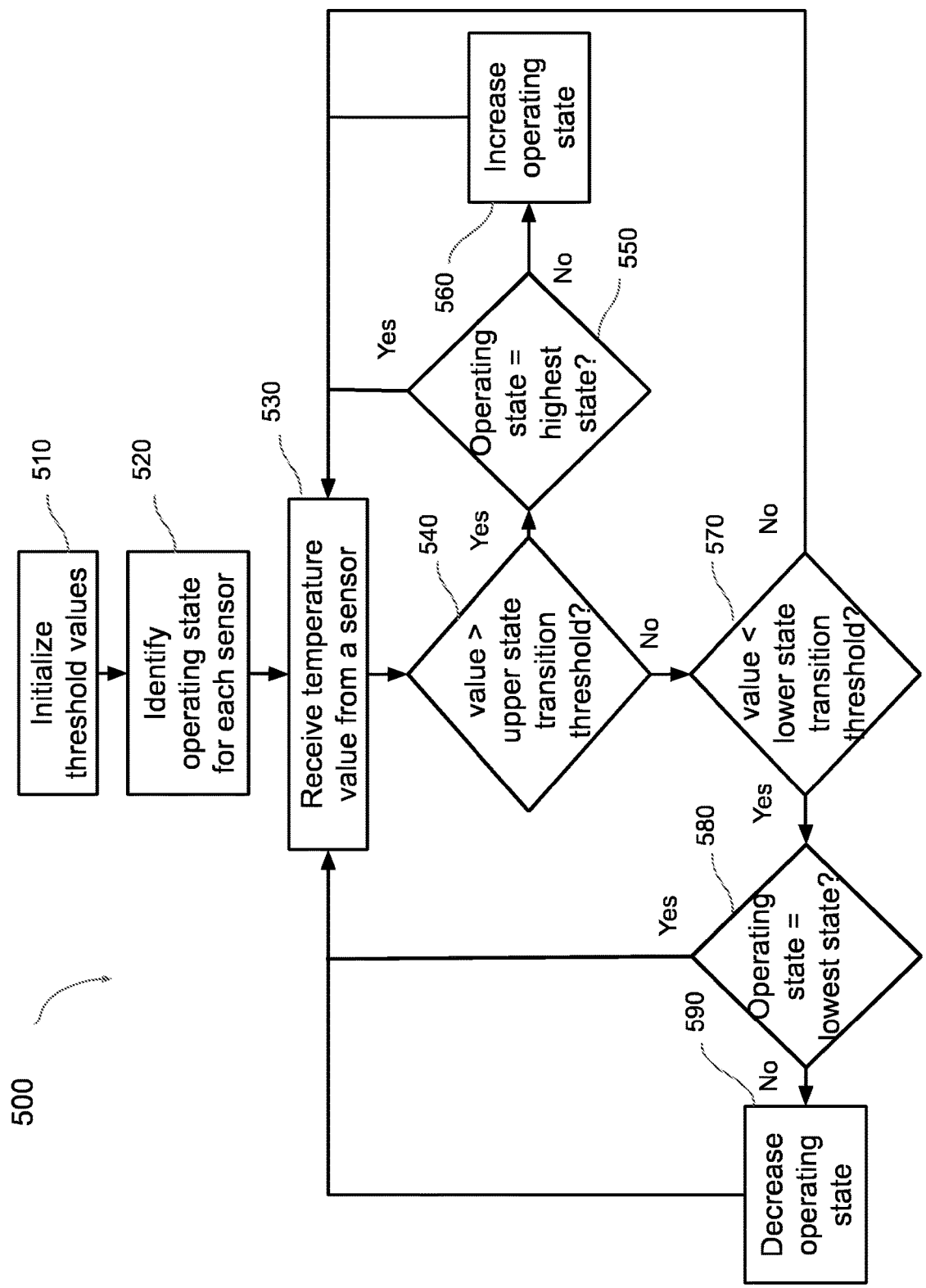
FIG. 5 is a flow chart of an exemplary process for changing the operating state of a sensor used as part of controlling temperature in an electronic device to which the principles of the present disclosure are applicable.

Turning to FIG. 5, a flow chart of an exemplary process 500 for changing operating state of a sensor used as part of controlling temperature in an electronic device according to aspects of the present disclosure is shown. Process 500 is primarily described with respect to a communication device, such as communication 100 described in FIG. 1. Some or all of process 500 may be used with other electronic devices, such as electronic device 200 described in FIG. 2. Additionally, one or more of the steps of process 500 may be implemented in one or more of the software elements or modules described in software structure 300 in FIG. 3. Although process 500 depicts steps performed in a particular order for purposes of illustration and discussion, the operations discussed herein are not limited to any particular order or arrangement. One skilled in the art, using the disclosure provided herein, will also appreciate that one or more of the steps of process 500 may be omitted, rearranged, combined, and/or adapted in various ways.

At step 510, The set of threshold values for each is initialized. The threshold values may initially have a default value that can be updated through the initialization, at step 510. In some embodiments, the sensor threshold values may be retrieved from a memory (e.g., memory 190 in FIG. 1). In some embodiments, the threshold values may be retrieved from an external source through a set of control instructions user input commands to the controller (e.g., controller 110). For example, one or more threshold values may be entered by a user or operator either through a user interface (e.g., user interface 180) or on a website or web portal and communicated through a network interface (e.g., WAN transceiver 170, Ethernet interface 160, or WLAN transceiver 140).

At step 520, the current operating state for each sensor is identified. In some embodiments, the current operating state may be retrieved from a memory (e.g., memory 190). Also, at step 520, the one or more threshold values associated with the current operating state for each sensor are identified for use as part of process 500. As described in process 500, two threshold values are used. An upper state transition threshold value is used to determine whether to change the current operating state for a sensor to the next higher operating state (e.g., from normal operating state to first elevated thermal operating state). A lower state transition threshold value is used to determine whether to change the current operating state for a sensor to the next lower operating state (e.g., from the first elevated thermal operating state to the normal operating state). In some embodiments, the lower state transition threshold value for a higher operating state may be less than or lower than the upper state transition threshold value for a lower operating state as described above. In other embodiments, different arrangements and configurations for threshold values may be used.

At step 530, temperature values from each sensor are received. The temperature values are received by a controller (e.g., controller 110 in FIG. 1). At step 540, a determination is made as to whether the temperature value received from a sensor, at step 530, is greater or higher than the upper state transition threshold value associated with the current operating state for the sensor. In some embodiments, the value from the sensor may be required to exceed the upper state transition threshold value for a period of time as described above. If at step 540, the temperature value for the sensor is greater or higher than the upper state transition threshold value, then at step 550, a further determination is made as to whether the current operating state for the sensor is equal to the maximum or highest operating state that is available. If, at step 550, the current operating state for the sensor is equal to the maximum or highest operating state, then process 500 returns to step 530, to receive new temperature values. If, at step 550, the current operating state for the sensor is not equal to the maximum or highest operating state, then, at step 560, the operating state for the sensor is increased to the next higher operating state. Also, at step 560, the new operating state for the sensor is stored in memory (e.g., memory 190 in FIG. 1).

If at step 540, the temperature value for the sensor is not greater or higher than the first threshold value then at step 570, a determination is made as to whether the temperature value received from a sensor, at step 530, is lower or less than the lower state transition threshold value associated with the current operating state for the sensor. In some embodiments, the value from the sensor may be required to be lower or less than the lower state transition threshold value for a period of time as described above. If at step 570, temperature value is not less than lower threshold value, then process 500 returns to continue receiving new temperature values, at step 530. If at step 570, the temperature value for the sensor is lower or less than the lower state transition threshold value, then at step 580, a further determination is made as to whether the current operating state for the sensor is equal to the minimum or lowest operating state that is available. If, at step 580, the current operating state for the sensor is equal to the minimum or lowest operating state, then process 500 returns to step 530, receiving new temperature values.

If, at step 580, the current operating state for the sensor is not equal to the minimum or lower operating state, then, at step 590, the operating state for the sensor is decreased to the next lower operating state. Also, at step 590, the new operating state for the sensor is stored in memory (e.g., memory 190 in FIG. 1). Process 500 returns to continue receiving new temperature values, at step 530.

Figure 6:
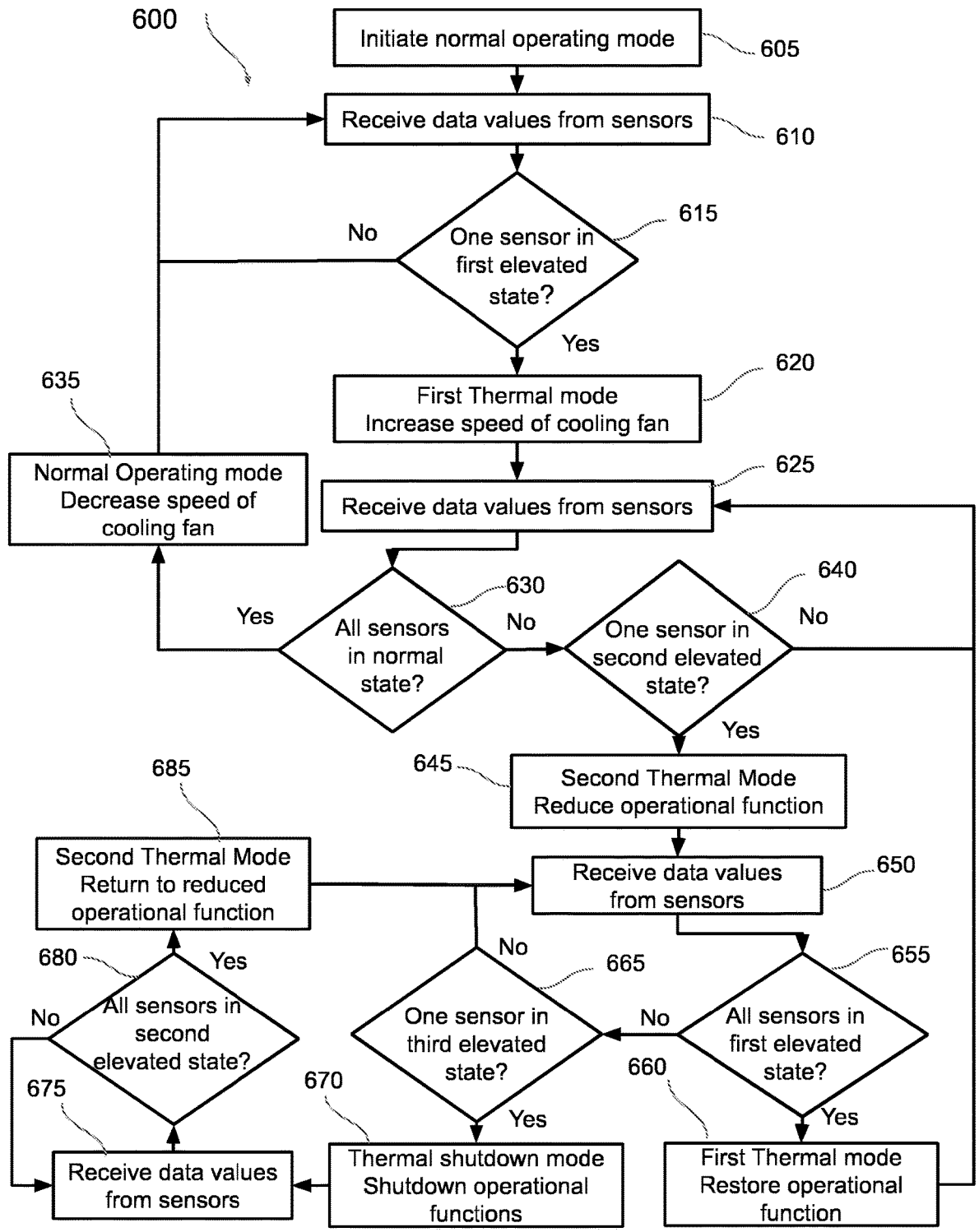
FIG. 6 is a flow chart of another exemplary process for controlling temperature in an electronic device to which the principles of the present disclosure are applicable.

Turning to FIG. 6, a flow chart of an exemplary process 600 for controlling temperature in an electronic device according to aspects of the present disclosure is shown. Process 600 is primarily described with respect to a communication device, such as communication 100 described in FIG. 1. Some or all of process 400 may be used with other electronic devices, such as electronic device 200 described in FIG. 2. Further, one or more of the steps of process 600 may be used as part of, instead of, or in addition to, one or more of the steps described in process 400 as part of a combined process. Additionally, one or more of the steps of process 600 may be implemented in one or more of the software elements or modules described in software structure 300 in FIG. 3. Although process 600 depicts steps performed in a particular order for purposes of illustration and discussion, the operations discussed herein are not limited to any particular order or arrangement. One skilled in the art, using the disclosure provided herein, will also appreciate that one or more of the steps of process 600 may be omitted, rearranged, combined, and/or adapted in various ways.

At step 605, the device (e.g., communication device 100) is initially placed into a normal operating mode. The device may be placed into the normal operating mode when the device is first turned on or re-started. In normal operating mode, the fan (e.g., fan 195) may either be turned off or alternatively, running at its lower speed of operation based on inputs from a fan manager (e.g., fan manager 310 in FIG. 3). Normal operating mode may include identifying or retrieving threshold values associated with the operating states for each of the sensors. At step 610 data values from the set of sensors (e.g., sensors 130) are received in a manner similar to that described at step 410 in process 400.

At step 615, a determination is made as to whether a sensor from the set of sensors (e.g., sensors 130) is operating in, or has entered, a first elevated thermal operating state. In some embodiments, the determination, at step 615, may include determining if a value, such as a temperature, from the sensor has exceeded a first, or upper state transition, threshold value as described above.

If, at step 615, the determination is made that one sensor is not in the first elevated thermal operating state, then process 600 returns to receiving data values from the set of sensors, at step 610. If, at step 615, the determination is made that one sensor from the set of sensors (e.g., sensors 130) is in the first elevated thermal operating state, then, at step 620, the device is placed into a first elevated thermal operating mode. The first elevated thermal operating mode includes executing instructions to increase the operating speed of the fan (e.g., fan 195). In some embodiments, a controller (e.g., controller 110) or processor may generate control instructions for increasing the operating speed of the fan through a fan manager (e.g., fan manager 310) as described above. The device remains in the first elevated thermal operating mode as long as at least one sensor from the set of sensors is in the first elevated thermal operating state.

At step 625, with the device (e.g., communication device 100) operating in the first elevated thermal operating mode, additional data values are received from the set of sensors in a manner similar to step 610. At step 630, a determination is made as to whether all of the sensors from the set of sensors are in a normal operating state in a manner similar to that described at step 420 in process 400. In some embodiments, the determination, at step 630, may include determining if a value, such as a temperature, from the sensor is below or less than a second, or lower state transition, threshold value as described above.

If, at step 630, the determination is made that all of the sensors from the set of sensors are in a normal operating state, then at step 635, the device is placed back into the normal operating mode. The normal operating mode includes executing instructions to decrease the operating speed of the fan (e.g., fan 195) to the lowest operating speed or turning, or alternatively turning the fan off. In some embodiments, a controller (e.g., controller 110) or processor may generate control instructions for decreasing the operating speed of the fan through a fan manager (e.g., fan manager 310 in FIG. 3) as described above. Process 600 returns to receiving data values from the set of sensors at step 610.

If, at step 630, the determination is made that all of the sensors from the set of sensors are not in a normal operating state, then, at step 640, a determination is made as to whether at least one sensor from the set of sensors is in a second elevated thermal operating state. The determination, at step 640, may be made in a manner similar to that described at step 440 in process 400 above, using a value for the first, or upper state transition, threshold value that is associated with the first elevated thermal operating mode. If, at step 640, the determination is made that at least one sensor from the set of sensors is not in a second elevated thermal operating state, then process 600 returns to receiving data values from the set of sensors, at step 625.

If, at step 640, the determination is made that one sensor from the set of sensors (e.g., sensors 130) is in the second elevated thermal operating state, then, at step 645, the device (e.g., controller 110) is placed into a second elevated thermal operating mode. The second elevated thermal operating mode includes executing instructions to reduce the operational functionality of one or more components in the device as described above while maintaining the increased operating speed of the fan (e.g., fan 195). In some embodiments, a controller (e.g., controller 110) or processor may generate control instructions for altering the functionality of one or more components in the device through a thermal throttle manager (e.g., thermal throttle manager 360 in FIG. 3) as described above. The device remains in the second elevated thermal operating mode as long as at least one sensor from the set of sensors is in the second elevated thermal operating state.

At step 650, while the device (e.g., communication device 100) is operating in the second elevated thermal operating mode, additional data values are received from the set of sensors in a manner similar to step 610. At step 655, a determination is made as to whether all of the sensors from the set of sensors are in the first elevated thermal operating state. The determination, at step 655, is made in a manner similar to that described at step 630 above. If, at step 655, the determination is made that all of the sensors from the set of sensors are in the first elevated thermal operating state, then at step 660, the device is placed back into the first elevated thermal operating mode. The first elevated thermal operating mode includes executing instructions to return full operational functionality to the device (e.g., device 100) while maintaining the increased operating speed of the fan (e.g., fan 195). In some embodiments, a controller (e.g., controller 110) or processor may generate control instructions for altering the functionality of one or more components in the device through a thermal throttle manager (e.g., thermal throttle manager 360 in FIG. 3) as described above. Process 600 returns to receiving data from the set of sensors, while the device is in the first elevated thermal operating mode, at step 625.

If, at step 655, the determination is made that all of the sensors from the set of sensors are not in the first elevated thermal operating state, then at step 665, a determination is made as to whether at least one sensor from the set of sensors is in a third elevated thermal operating state. The determination, at step 665, may be made in a manner similar to that described at step 640 above, using a value for the first, or upper state transition, threshold value that is associated with the second elevated thermal operating mode. If, at step 665, the determination is made that at least one sensor from the set of sensors is not in a third elevated thermal operating state, then process 600 returns to receiving data values from the set of sensors, at step 650.

If, at step 665, the determination is made that one sensor from the set of sensors (e.g., sensors 130) is in the third elevated thermal operating state, then, at step 670, the device (e.g., controller 110) is placed into a thermal shutdown operating mode. The thermal shutdown operating mode includes executing instructions to disable the operation of all components in the device not needed to maintain a shutdown, standby, or sleep condition for the device. In some embodiments, the increased operating speed of the fan (e.g., fan 195) may be maintained. In some embodiments, a controller (e.g., controller 110) or processor may generate control instructions for disabling the components in the device through a thermal throttle manager (e.g., thermal throttle manager 360 in FIG. 3) as described above. The device may remain in the thermal shutdown operating state for a predetermined period of time sufficient for the temperature in the device to be reduced, such as 30 minutes. After 30 minutes, the processor may enter partial operation and begin receiving data values from the sensors (e.g., sensors 130), at step 675. Alternatively, the controller or processor may enter partial operation and periodically request and receive data values from the sensors, at step 674. As before, the device remains in the thermal shutdown operating mode as long as at least one sensor from the set of sensors is in the second elevated thermal operating state.

At step 680, a determination is made as to whether all of the sensors from the set of sensors are in the second elevated thermal operating state. The determination, at step 680, is made in a manner similar to that described at step 630 above. If, at step 655, the determination is made that all of the sensors from the set of sensors are not in the first elevated thermal operating state, then process 600 returns to receiving data values from the set of sensors, at step 675.

If, at step 680, the determination is made that all of the sensors from the set of sensors are in the first elevated thermal operating state, then at step 685, the device is placed back into the second elevated thermal operating mode. The second elevated thermal operating mode includes executing instructions to return to a reduced operational functionality to the device (e.g., device 100) while maintaining the increased operating speed of the fan (e.g., fan 195) as described at step 645. In some embodiments, a controller (e.g., controller 110) or processor may generate control instructions for altering the functionality of one or more components in the device through a thermal throttle manager (e.g., thermal throttle manager 360 in FIG. 3) as described above. Process 600 returns to receiving data from the set of sensors, while the device is in the second elevated thermal operating mode, at step 650.

It is to be appreciated that although the embodiments described above focus on physical hardware and elements within a device, the principles of the present disclosure may be easily extended to implementations that involve software based programming instructions that are stored in a computer readable medium, such as a magnetic optical based storage structure, and executed by one or more processors in a device. Further, in some embodiments, one or more of the elements of a process based on the principles of the present disclosure, such as process 400, process 500, or process 600 described above, may be implemented utilizing cloud-based operations and/or storage. It is to be appreciated that, except where explicitly indicated in the description above, the various features shown and described are interchangeable, that is, a feature shown in one embodiment may be incorporated into another embodiment.

Although embodiments which incorporate the teachings of the present disclosure have been shown and described in detail herein, those skilled in the art can readily devise many other varied embodiments that still incorporate these teachings. Having described preferred embodiments of an apparatus and method for controlling temperature in an electronic device, it is noted that modifications and variations can be made by persons skilled in the art in light of the above teachings. It is therefore to be understood that changes may be made in the particular embodiments of the disclosure which are within the scope of the disclosure as outlined by the appended claims.

The invention claimed is:

1. A method comprising:
receiving data values representing temperature from a plurality of temperature sensors, each one of the plurality of temperature sensors associated with one component from a set of components, each component located at a different location in a device, at least one temperature sensor measuring air temperature in proximity to at least one component, the device operating in a normal mode;
determining if at least one data value for a first temperature sensor is greater than a first threshold value associated with the first temperature sensor;
providing a notification to enter a first elevated thermal mode of operation in the device if it is determined that the at least one data value for the first re sensor is greater than the first threshold value associated with the first temperature sensor, the first elevated thermal mode of operation including operation of a fan in the device;
determining, while the device is in a first elevated thermal mode of operation, if at least one data value for the first temperature sensor is less than a second threshold value associated with the first temperature sensor, the second threshold value being less than the first threshold value; and
providing a notification to enter a normal mode of operation for the device if it is determined that the at least one data value for the first temperature sensor is less than a third threshold value associated with the first temperature sensor.

2. The method of claim 1, wherein the at least one data value period of time includes at least two consecutive data values measured at a periodic interval of time.

3. The method of claim 2, wherein the periodic interval of time is at least 100 milliseconds.

4. The method of claim 1, wherein the first threshold value is an upper state transition threshold value associated with the plurality of sensors when operating in the normal thermal operating state and wherein the second threshold value is a lower state transition threshold value associated with the plurality of sensors when operating in the first elevated thermal operating state.

5. The method of claim 1, further comprising:
determining if at least one data value for the first temperature sensor is greater than a third threshold value associated with the temperature sensor, the third threshold value being greater than the first threshold value; and
providing a notification to enter a second elevated thermal mode for the device if it is determined that the at least one data value for the first temperature sensor is greater than the third threshold value associated with the first temperature sensor.

6. The method of claim 5, wherein the second elevated thermal mode of operation includes shutting down operation of the device.

7. The method of claim 5, wherein the second elevated thermal mode of operation includes operation of the fan in the device and a reduction of functionality in the device.

8. The method of claim 1, further comprising determining, while the device is in the first elevated thermal mode of operation, if at least one data value for a second temperature sensor is greater than a first threshold value associated with the second temperature sensor, the first threshold value associated with the second temperature sensor being different than the first threshold value associated with the first temperature sensor.

9. The method of claim 8, wherein determining, while the device is in a first elevated thermal mode of operation, if at least one data value for the first temperature sensor is less than a second threshold value associated with the first temperature sensor further includes determining if at least one data value for the second temperature sensor is less than a second threshold value associated with the second temperature sensor, the second threshold value associated with the second temperature sensor being different than the second threshold value associated with the first temperature sensor.

10. The method of claim 5, wherein the first elevated thermal mode of operation includes operation of the fan at a first fan speed and the second elevated thermal mode of operation includes operation of the fan at a second fan speed.

11. An apparatus comprising method comprising:
a memory; and
a processor coupled to the memory, the processor configured to:
receive data values representing temperature from a plurality of temperature sensors, each one of the plurality of temperature sensors associated with one component from a set of components, each component located at a different location in the apparatus, at least one temperature s sor measuring air temperature in proximity to at least one component;
determine, while operating in a normal mode, if at least one data value for a first temperature sensor is greater than a first threshold value associated with the first temperature sensor;
provide a notification to enter a first elevated thermal mode in the device if it is determined that the least one data value for the first temperature sensor is greater than the first threshold value associated with the first temperature sensor, the first elevated t al mode of operation including operation of a fan in the device;
determine, while in a first elevated thermal mode, if at least one data value for the first temperature sensor is less than a second threshold value associated with the first temperature sensor, the second thr bold value being less than the first threshold value; and
provide a notification to enter a normal mode for the device if it is determined that the at least one data value for the first temperature sensor is less than a third threshold value associated with the first temperature sensor.

12. The apparatus of claim 11, wherein the at least one data values period of time includes at least two consecutive data values measured at a periodic interval of time.

13. The apparatus of claim 12, wherein the periodic interval of time is at least 100 milliseconds.

14. The apparatus of claim 11, wherein the first threshold value is an upper state transition threshold value associated with the plurality of sensors when operating in the normal operating state and wherein the second threshold value is a lower state transition threshold value associated with the plurality of sensors when operating in the first elevated thermal operating state.

15. The apparatus of claim 11, wherein the processor is further configured to:
determine if at least one data value for the first temperature sensor is greater than a third threshold value associated with the temperature sensor the third threshold value being greater than the first threshold value; and
provide a notification to enter a second elevated thermal mode for the device if it is determined that the at least one data value for the first temperature sensor is greater than the third threshold value associated with the first temperature sensor.

16. The apparatus of claim 15, wherein the second elevated thermal mode of operation includes shutting down operation of the device.

17. The apparatus of claim 15, wherein the second elevated thermal mode includes operation of the fan in the device and a reduction of functionality in the device.

18. The apparatus of claim 15, wherein the first elevated thermal mode of operation includes operation of the fan at a first fan speed and the second elevated thermal mode of operation includes operation of the fan at a second fan speed.

19. The apparatus of claim 11, wherein the processor further determines, while the apparatus is in the first elevated thermal mode of operation, if at least one data value for a second temperature sensor is greater than a first threshold value associated with the second temperature sensor, the first threshold value associated with the second temperature sensor being different than the first threshold value associated with the first temperature sensor.

20. The apparatus of claim 19, wherein wherein the processor determining, while the device is in a first elevated thermal mode of operation, if at least one data value for the first temperature sensor is less than a second threshold value associated with the first temperature sensor further includes determining if at least one data value for the second temperature sensor is less than a second threshold value associated with the second temperature sensor, the second threshold value associated with the second temperature sensor being different than the second threshold value associated with the first temperature sensor.

* * * * *